(12) United States Patent
Vishik et al.

(10) Patent No.: US 7,450,696 B2
(45) Date of Patent: Nov. 11, 2008

(54) KNOWLEDGE MANAGEMENT, CAPTURE AND MODELING TOOL FOR MULTI-MODAL COMMUNICATIONS

(75) Inventors: Claire Svetlana Vishik, Austin, TX (US); Lalitha Suryanarayana, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1026 days.

(21) Appl. No.: 10/843,689

(22) Filed: May 11, 2004

(65) Prior Publication Data

US 2005/0254481 A1    Nov. 17, 2005

(51) Int. Cl.
*H04M 11/06* (2006.01)

(52) U.S. Cl. .............. 379/88.13; 370/390; 704/260; 709/229; 715/209

(58) Field of Classification Search ............ 379/110.01, 379/88.13; 340/539.11; 455/417, 445; 709/206, 709/229; 370/390; 704/260; 715/209
See application file for complete search history.

(56) References Cited

U.S. PATENT DOCUMENTS

| | | | |
|---|---|---|---|
| 5,323,444 A | 6/1994 | Ertz et al. | |
| 5,379,337 A | 1/1995 | Castillo et al. | |
| 5,448,630 A | 9/1995 | Barstow | |
| 6,240,168 B1 * | 5/2001 | Stanford et al. | 379/110.01 |
| 6,560,222 B1 | 5/2003 | Pounds et al. | |
| 6,584,490 B1 | 6/2003 | Schuster et al. | |
| 6,611,533 B1 | 8/2003 | Liao et al. | |
| 6,611,682 B1 * | 8/2003 | Projtz | 455/417 |
| 6,636,242 B2 | 10/2003 | Bowman-Amuah | |
| 6,640,249 B1 | 10/2003 | Bowman-Amuah | |
| 6,690,929 B1 | 2/2004 | Yeh | |
| 6,703,930 B2 * | 3/2004 | Skinner | 340/539.11 |
| 6,707,889 B1 | 3/2004 | Saylor et al. | |
| 6,714,635 B1 | 3/2004 | Adams et al. | |
| 6,738,616 B1 | 5/2004 | Link, II et al. | |
| 6,748,054 B1 | 6/2004 | Gross et al. | |
| 6,748,057 B2 | 6/2004 | Ranalli et al. | |
| 6,748,062 B2 | 6/2004 | Alcott et al. | |
| 6,748,318 B1 | 6/2004 | Jones | |
| 6,754,323 B1 | 6/2004 | Chang et al. | |
| 6,768,788 B1 | 7/2004 | Langseth et al. | |
| 6,941,345 B1 * | 9/2005 | Kapil et al. | 709/206 |
| 2004/0097235 A1 * | 5/2004 | Siegel | 455/445 |

* cited by examiner

*Primary Examiner*—Gerald Gauthier
(74) *Attorney, Agent, or Firm*—Toler Law Group

(57) ABSTRACT

Via a user interface, a user creates a device group that identifies communication devices of the user, the devices having different communication addresses. At least one of the devices is user-designated to receive an aggregated list of communications made with the devices in the user-defined device group. Communications made using devices in the group are detected, entries for the aggregated list are generated based thereon, and the entries are provided to the designated communication device(s). Thereafter, the user edits the user-defined device group via the user interface to add a communication device thereto or to remove a communication device therefrom.

52 Claims, 4 Drawing Sheets

```
<?xml version="1.0"?>
<rdf:RDF>
xmlns:rdf="http://www/w3.org/TR/WE-rdf-syntax#"
xmlns:cl="http://calls.org/metadata/call_list"
<rdf:Description id="Call1">
<cl:Title>Message from the CIO</cl:Title>
<cl:Annotation>He believes we need to continue discussions to arrive at
agreement on price points</cl:Annotation>
<cl:ContactName>John Doe</cl:ContactName>
<cl:Device>Wireline Phone 2</cl:Device>
<cl:DeviceID>666777845</cl:DeviceID>
<cl:Date>2004-01-05</cl:Date>
<cl:Type>Voicemail</cl:Type>
<cl:Format>Voice</cl:Format>
<cl:Identifier>t-5550149-ph</cl:Identifier>
</rdf:Description>
</rdf:RDF>
```

FIG. 3

```
<cl:DeviceGroup cl:DeviceGroupID="657483" DeviceGroupName="MyPhones">
<cl:Device cl:DeviceID="657499d-65" cl:DeviceType="LandlinePhone"
cl:DeviceAddress="512-555-0125" cl:DeviceStatus="Active"
cl:synchUpdateMode="Yes" cl:Attempts="1" cl:Choice="yes"
cl:asynchUpdateMode="Yes" cl:DeviceName="Primary Work Phone Line"
cl:SendingProtocol="PhoneProtocol" cl:ReceivingProtocol="PhoneProtocol"
cl:DevicePriority="FirstInGroup">
</cl:Device>
</cl:DeviceGroup>
```

FIG. 4

Allen Smith 512-555-0140 8:20 am
CompanyName (t2) 212-555-0102 8:21 am
CompanyName (t3) cn@pagerservice.com Please call ASAP 212-555-0102 8:22 am
Mary Doe (t4) 847-555-0111 8:23 am
Unavailable 8:25 am Message

FIG. 6

| Andy Martin's Communications List 0 -- Brief View | | |
|---|---|---|
| Click Here for Detailed View (+Annotations) | | |
| 📧 My call to Mr. Stein, ED at Cisco | Phone 1 | 11/24/03 |
| └📧 Mr. Stein's Secretary called back | CellPhone 1 | 11/24/03 |
| └📧 ... and she sent a message with requirements | Email 1 | 11/24/03 |
| 📧 emailed Mr. Stein with full info about the product | Email 1 | 11/24/03 |
| └📧 His secretary acknowledged receipt | Email 1 | 11/24/03 |
| └📧 I called to follow up | WorkPhone | 11/24/03 |
| └📧 Mr. Stein called back | Phone 1 | 11/24/03 |
| └📧 I called Mr. Adler reporting to Mr. Stein to set up a meeting | Workhone 1 | 11/24/03 |
| └📧 I also sent email | Email 2 | 11/24/03 |
| └📧 Mr. Adler paged me to call Mr. Stein | Pager 1 | 11/24/03 |
| └📧 I called Mr. Stein | Phone 1 | 11/24/03 |

*FIG. 5*

KNOWLEDGE MANAGEMENT, CAPTURE AND MODELING TOOL FOR MULTI-MODAL COMMUNICATIONS

FIELD OF THE DISCLOSURE

The present disclosure relates to methods and systems for multi-modal communications.

DESCRIPTION OF THE RELATED ART

Many individuals use several different telephones for the same purpose. For example, a sales executive may use a main office telephone, a home office telephone and a cellular telephone all for the purpose of making business-related sales. Recently, other modes of communication, such as instant messaging and e-mail, have become an integral part of many processes. Unified messaging offers technologies to consolidate communications in multiple formats and make them available from one interface. To aggregate calls received by the individual's phones, call forwarding can be used to forward calls from each phone to a single one of the phones. Call forwarding allows the individual to screen calls received on various handsets for the same purpose. However, some calls may be missed if the individual is not using the handset to which the calls are forwarded. Communications in other formats usually are tabulated and managed separately.

Caller Identification (ID) functionality has improved telephone service by allowing users to control aspects of responding to telephone calls. However, using the aforementioned call forwarding method, the individual may be unable to identify an initial caller using caller ID.

BRIEF DESCRIPTION OF THE DRAWINGS

The present invention is pointed out with particularity in the appended claims. However, other features are described in the following detailed description in conjunction with the accompanying drawings in which:

FIG. 3 is an example of computer program code to represent an entry in the log database;

FIG. 4 is an example of computer program code to define a device group;

FIG. 5 is an example of a communications tree as displayed by the Web interface; and FIG. 6 shows an example of the aggregated list for hypothetical calls from hypothetical parties.

DESCRIPTION OF THE DRAWINGS

Embodiments of the present invention allow users to create a group of communication devices used for the same purpose (e.g. work). Caller ID functionality on each phone is aggregated over the group of devices to allow users to obtain, in real-time or near-real-time, a list of calls made to all devices in the group. Users can respond to all calls from the device that is currently active, which either may or may not be a telephone. Limitations of non-Internet wireline phones are described in greater detail herein. Thus, calls and other communications requiring immediate attention can be returned quickly regardless of which device they were initially addressed.

Other non-voice forms of communications, such as text messaging, are also aggregated in the list. The structure of all communications, voice and non-voice, is made visible to users through a single graphical interface.

Further, annotation, data mining, analysis and modeling of communication threads are facilitated by uniquely identifying each communication, and generating a hierarchical representation based thereon. Still further, search and retrieval of individual communications can be performed if archiving is enabled.

Embodiments of the present invention are described with reference to FIG. 1, which is a block diagram of an embodiment of a system for processing communications for a user-defined group of communication devices, and FIG. 2, which is a flow chart of an embodiment of a method of processing communications for the user-defined group of communication devices.

Figure 1:
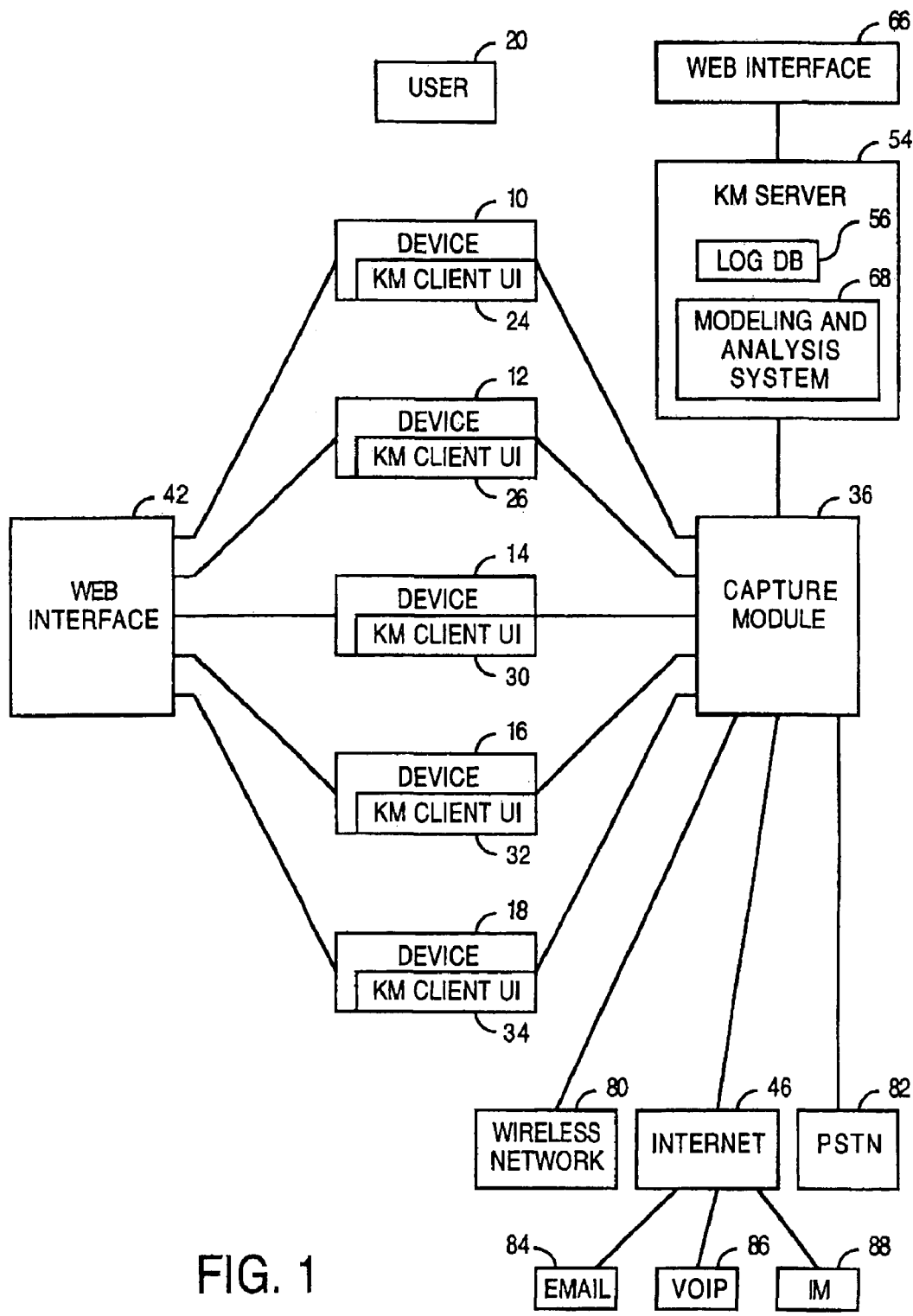
FIG. 1 is a block diagram of an embodiment of a system for processing communications for a user-defined group of communication devices.

Illustrated in FIG. 1 are multiple communication devices 10, 12, 14, 16 and 18 of a user 20. Although five communication devices 10, 12, 14, 16 and 18 are depicted in FIG. 1 for purposes of illustration and example, the system can be used in conjunction with any number of communication devices of the user 20. The communication devices 10, 12, 14, 16 and 18 may facilitate voice-based and/or text-based communications for the user 20. Examples of the communication devices 10, 12, 14, 16 and 18 include, but are not limited to, a wireless telephone, a landline telephone, an Internet telephone, a portable computer, a personal digital assistant, a messaging device, and a paging device.

The communication devices 10, 12, 14, 16 and 18 have different communication addresses, which may comprise different physical network addresses and/or different logical network addresses. As used herein, a network address can comprise either a telephone number, an Internet telephone number, an electronic mail address, an Internet protocol address, an instant messaging address, or a paging number. It is noted that a converged device may have logically different communication addresses, even if the network address is the same and the device is the same, for different communication applications. It is also noted that the telephone numbers may comprise a virtual telephone number.

For purposes of illustration and example, consider the communication devices 10, 12, 14, 16 and 18 being the user's work telephone, work e-mail device, home telephone, cellular telephone and pager, respectively.

Figure 2:
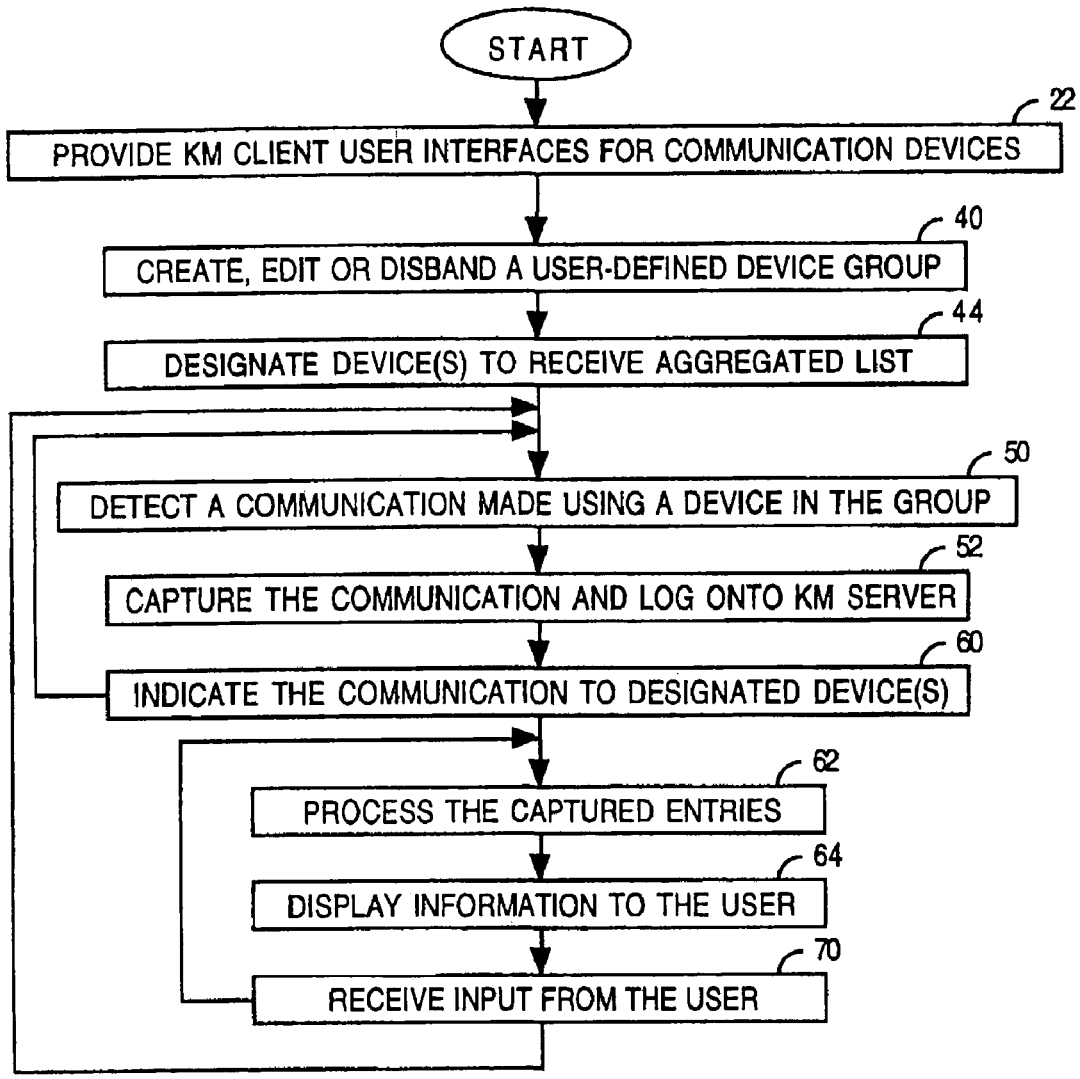
FIG. 2 is a flow chart of an embodiment of a method of processing communications for the user-defined group of communication devices.

As indicated by block 22 in FIG. 2, each of the communication devices 10, 12, 14, 16 and 18 is provided a knowledge management (KM) client user interface 24, 26, 30, 32 and 34, respectively. The KM client user interfaces 24, 26, 30, 32 and 34 cooperate with a capture module 36 to enable the user 20 to monitor, screen and return calls and other communications from any device in a group defined by the user 20.

As indicated by block 40, the method comprises an act of creating a user-defined device group that identifies a plurality of communication devices and/or communication lines of the user 20. The user 20 creates the user-defined device group via a Web interface 42 or another user interface such as an Instant Messaging client or a graphical user interface (GUI). Using the Web interface 42, the user 20 defines which of his/her communication devices 10, 12, 14, 16 and 18 are to be part of the device group. In one embodiment, the capture module 36 interfaces and interacts with a database that stores and maintains logical identifiers to the devices and access modes defined in the device group. The database may comprise an ENUM database, for example. Address translation and mapping of an identifier of a device or communication access mode can be stored in a public or private ENUM. For example, instant messaging has an associated screen name, email has an associated simple mail transfer protocol (SMTP) address, a phone number has an associated E.164-type number, and an IP telephone has an associated IP address. The ENUM or other database can further indicate a status of an active device in the device group.

As indicated by block 44, the method comprises designating at least one of the communication devices in the user-defined device group to receive an aggregated list of communications made with the communication devices in the user-defined device group. The user can make the designation using the Web interface 42. If desired, the user can designate all of the communications devices in the user-defined device group to receive the aggregated list. Some devices, such as conventional landline telephones, may not be capable of providing the aggregated list, but nevertheless may be included in the user-defined device group. Preferably, all telephones that are designated either have access to the Internet 46 or are wireless access protocol (WAP)-enabled.

As indicated by block 50, the method comprises detecting a communication made using a communication device in the user-defined device group. The communication may comprise a telephone call, an electronic mail message, a voice message, an instant message, or a pager message. The communication may be either received or transmitted by the user 20 from/to another party. Other media of communication can be included as they appear and begin to be supported on multiple devices, e.g. video calls. The act of detecting can be performed by at least one of signaling system 7 (SS7) triggers, an automatic forwarding of e-mail or metadata about e-mail in a mail transfer protocol such as simple mail transfer protocol (SMTP), program code in a short messaging service center (SMSC) or an instant messaging server, and a session initiation protocol (SIP) signaling mechanism.

As indicated by block 52, the capture module 36 captures the communication and logs onto a KM server 54. The KM server 54 provides a log database 56 that logs communications, including the aggregated list of communications, made by the user 20. The KM server 54 stores an entry in the log database 56 based on the communication. The entry includes information identifying which device in the user-defined device group is involved in the communication, which is the "active" device, whether the communication was initiated by the user (e.g. the user 20 has placed a telephone call to another party) or another party (e.g. another party has placed a telephone call to the user 20), and optionally information identifying the other party of the communication. Alternatively, the entry can provide links to the above information. Archiving of full or partial communications can be provided as an additional function. Examples of the log database 56 include, but are not limited to, an XML database, a relational database management system (RDBMS) database, an object-oriented database (OODB) and a text file.

Optionally, presence information can be communicated to one or more network elements (not illustrated). The presence information comes from the active device on which calls are received to indicate that the user 20 is present and available on the active device. The presence information may indicate a communication mode of the active device.

As indicated by block 60, the method comprises providing the entry to each communication device designated to receive the aggregated list. In one embodiment, the entry is communicated to each designated device via either the Internet 46 or a wireless data network. Each designated device can display the entry using its respective KM client user interface. Thus, the list created as call/message information from various devices is forwarded to the designated device(s).

Using the KM client user interface, the user 20 can sort the aggregated list by time (which is a default option), by origination point, or by name, for example. Further using the KM client user interface, the user 20 can scroll the aggregated list and select a particular entry to initiate a response to a received communication associated with the particular entry. The response may comprise returning a telephone call, forwarding for further action, sending an electronic mail message, sending a pager message, or sending an instant message, for example. Acts indicated by blocks 50, 52 and optionally 60 are performed to process the response communication. Optionally, the KM client user interface either can link the list to the user's address book or can update the address book based on an entry.

The acts indicated by blocks 50, 52 and 60 can be repeated for each of one or more additional communications made with communication devices in the user-defined device group. For example, based on detecting a first communication made using a first communication device in the group, a first entry for the aggregated list is generated and provided to the communication device(s) designated to receive the aggregated list. Thereafter, based on detecting a second communication made using a second communication device in the group, a second entry for the aggregated list is generated and provided to the communication device(s) designated to receive the aggregated list.

It is noted that the first communication can be made using a first mode of a converged communication device, and the second communication can be made using a second mode of the converged communication device. Thus, the same converged communication device may have a voice call mode for a voice communication and a messaging mode for a messaging communication such as short message service (SMS).

As indicated by blocks 62 and 64, the method comprises the KM server 54 processing the captured entries in the log database 56 to display information to the user 20 via a Web interface 66 or another user interface such as a GUI. The entries may be processed by an analysis and modeling system 68 for retrieval and analysis using text and multimedia processing and statistical analysis. The entries are processed to allow the user 20 to analyze the communications and interaction patterns to gain knowledge about a model of his/her communications within a certain context. For example, if a response call/message originates from the single aggregated list, its relationship with other preceding and subsequent calls/messages can be retrieved via the Web interface 66 or another interface as a thread similar to e-mail threads on electronic bulletin boards. The analysis and modeling system 68 can automate the processing using off-the-shelf or enhanced tools, or can be done manually. The analysis and modeling system 68 can be interfaced with an external system such as a billing system or a sales force automation system.

An ontology or hierarchy of communication threads can be automatically generated by the KM server 54. As a result, the dynamics of multiple conversations are made visible to the user 20 via the Web interface 66. This is beneficial in sales and marketing communications, online education and training communications, and various social communications. Further, the hierarchical representation of communications allows various modeling applications to be performed by the analysis and modeling system 68. Examples of the modeling applications include, but are not limited to, predicting the success of contract negotiations, optimizing group work, and optimizing calling and/or Internet plans for various situations.

In one embodiment, the calls and messages in the log database 56 have identifiers (IDs) to represent inheritance. Using the inheritance IDs, the KM server 54 can represent the calls and messages as a tree that is displayed to the user 20 via the Web interface 66 or another interface.

As indicated by block 70, the method comprises receiving input from the user 20 via the Web interface 66. The input can comprise annotations and/or other additional information to associated with particular communications in the log database 56. The nature and type of annotation for each communication is flexible dependent upon the application, purpose and user. The annotations may be multi-modal. Alternatively, the input can comprise commands to indicate how the user wants to organize the communications, for example, how the user wants to categorize the information or otherwise view the communications as a tree. As another alternative, the input can comprise commands to search for particular communications or communication topics in the log database 56. If archiving is enabled, full content can be searched as well. As a further alternative, the input can comprise commands to link entries, e.g. to link the first entry and the second entry. The Web interface 66 can support a private link command to make the link visible only to one or more designated users, such as the owner of the device group.

The KM server 54 responds by updating the Web interface 66 based on the user input, as indicated by returning to block 64. Multiple iterations of interaction between the user 20 and the KM server 54 via the Web interface 66 can occur to allow the user 20 to analyze the communication and interaction patterns. Based on the user's analysis, the user may forecast, improve productivity, or optimize a service bundle, for example. As an option, communications can be archived and retrieved later by the KM server 54. In addition to modeling and analysis, business models based on group interactions can be developed. An example of a business model is pricing for a bundle of voice and text communications for families. Continuing with this example, a family plan can be developed based on the analysis to provide some member the ability to answer messages without initiating communications. Two other specific examples of analysis are as follows.

EXAMPLE 1

A sales person analyzes his/her communications with prospects. He/she notices that a first prospect very rarely returns phone calls, but writes e-mail on a regular basis. The sales person decides to use predominantly text-based means to communicate with the first prospect. A second prospect almost never returns communications in any format. Upon noticing this, the sales person decides to make inactive a line associated with the second prospect. However, the sales person decides to more actively pursue the second prospect as a potential client because of a significantly greater than average activity index.

EXAMPLE 2

The sales person decides to analyze the success of communications for the past six months. The KM server 54 retrieves data from the log database 56, analyzes the data using the analysis and modeling system 68, and presents via the Web interface 66 information showing that almost all prospects have a lower than usual activity index. The sales person can use this information as a market predictor or as a signal to review the approach to the sales process.

At any time, flow of the method can return to block 40 in FIG. 2, wherein the user 20 either modifies an existing device group, disbands an existing device group, or creates a new device group via the Web interface 42. An existing device group can be modified either by adding another communication device thereto, or removing a communication device therefrom.

It is noted that a device group can identify a communication line, such as a phone line, or a virtual line on demand enabled by Voice over Internet Protocol (VoIP) for example. Some converged devices, such as those which enable VoIP as well as TDM, are each considered as multiple devices or lines as used herein.

After a device is removed from the device group, the aggregated list is kept unchanged in response to subsequent communications made using the device. For example, consider a third communication device that is removed from the device group. Thereafter, if a third communication is made using the third communication device, the aggregated list is kept unchanged based on the third communication.

After a device is added to the device group, the aggregated list is updated in response to subsequent communications made using the device. For example, consider a fourth communication device that is added to the device group. Thereafter, a fourth communication made using the fourth communication device is detected, and an entry based thereon is generated and provided to the communication device(s) designated to receive the aggregated list.

After a device group is disbanded, no aggregated list is provided in response to subsequent communications using the devices/lines in the previously-active device group. In one embodiment, the devices/lines go back to the conventional paradigm after the device group is disbanded.

FIG. 3 is an example of computer program code to represent an entry in the log database 56. In this example, the code is represented in an eXtensible Markup Language (XML)-derivative language such as Resource Description Framework (RDF).

The code comprises tags and values to define a title (e.g. "Message from the CIO"), an annotation (e.g. "He believes we need to continue discussions to arrive at agreement on price points"), a contact name (e.g. "John Doe"), a device involved in the communication (e.g. a second wireless phone), a device ID to identify the device (e.g. 666777845), a date of the communication (e.g. 2004-01-05), a type of communication (e.g. voice mail), a format of the communication (e.g. voice or text), and an identifier of the communication (e.g. "t-5550149-ph"). Use of the communication identifier in a tagged language, such as XML or its successors, facilitates the definition of relationships between entries in the log database 56, e.g. relationships between calls and/or messages.

Use of a tagged language, such as XML or its successors, also facilitates the definition of groups of devices. FIG. 4 is an example of computer program code to define a device group. The code comprises tags and values to define a device group identifier (e.g. "657483"), a device group name (e.g. "MyPhones"), an identifier of a device in the group (e.g. "657499d-65"), a type of the device (e.g. a landline phone), a device address (e.g. the phone number "512-555-1025"), a status of the device (e.g. "active"), synchronous update mode parameters, asynchronous update mode parameters, a sending protocol, a receiving protocol and a device priority (e.g. make this device the first priority in the group).

FIG. 5 is an example of a communications tree as displayed by the Web interface 66. Associated with each entry in the tree is an annotation describing or summarizing the nature of the communication, an indication of which device in the user-defined device group was involved in the communication, and a date of the communication. Further, each communication indicates if it is a reply/response to another communication, and indicates which other communication is its parent in the tree. A time stamp and an identifier may also be provided.

A detailed example of a user using an embodiment of the method and system is as follows.

1. The user uses a Web browser to create, disband, or edit a group of devices via the Web interface 42. For example, if he/she is traveling to California, he/she may edit the group to include his/her office phone, home phone, work cellular phone and PDA in the group.

2. The user designates the work cellular phone to receive the aggregated list of calls on its caller ID. Alternatively, all devices in the group can display the list. FIG. 6 shows an example of the aggregated list for hypothetical calls from hypothetical parties. The list is based on five entries in the log database 56.

3. The list contains the name, if available, and number associated with the origination of each call as well as the designation of the device where the call was received if it is not the device displaying the list. By having no designation, a first entry in the list indicates a call from Allen Smith received by the user's main phone, e.g. the user's cellular phone which is designated to receive the list. By having a "t2" designation, a second entry in the list indicates a call from a company received by the user's home phone. By having a "t3" designation, a third entry in the list indicates a pager message from the company received by the user's pager. The third entry indicates a message to call the sender at a particular telephone number. By having a "t4" designation, a fourth entry in the list indicates a call to the user's work phone. By having no designation, a fifth entry in the list indicates a call to the user's main phone.

4. The user can scroll through the list of calls, select a call that appears to be important, and press a "return" button on the KM client user interface of the cellular phone to return the call. As illustrated in FIG. 6, the user may select the second entry, and press the "return" button to call back the company.

5. The cellular phone may be set to ring when an important call is received on a different phone in the group. Further, the cellular phone may highlight calls in the list that have important originations. These features are set by the user through the Web interface 42 used for defining the group.

6. The user disbands the group via the Web interface 42 when the group is no longer needed. For example, the user may disband the group when he/she returns from the trip. The user disbands the group either because he/she now has easier access to all of the telephones, or because he/she will need a different group of devices for a different project.

An example of the user organizing threads based on communication entries is as follows. This example shows a specific case of how relationships between communications can be developed to organize the communications in a ontology or taxonomy such as a user-defined categorization.

1. The user logs into a Web site that provides the Web interface 66.

2. The user selects an "interactions" tab or another user-selectable control of the Web interface 66 to initiate thread creation features.

3. Using the Web interface 66, the user commands a search for all threads that include a certain name or phone number. The KM server 54 performs the search based on entries in the log database 56, and returns one or more threads.

4. Using the Web interface 66, the user selects a thread to explore in detail.

5. The user deems the thread to be important. Accordingly, the user names the thread and annotates some of the entries in the thread using the Web interface 66.

6. Using the Web interface 66, the user places the thread in a folder indicating a main topic of the thread. For example, the user may place the thread in a "new products" folder.

7. Using the Web interface 66, the user links the thread with one or more other threads that contain relevant information.

An example of the user executing the modeling functionality of the KM server 54 is as follows.

1. The user selects a particular thread using the Web interface 66.

2. The user clicks on a "modeling" tab or another user-selectable control of the Web interface 66 to initiate modeling features.

3. The user selects a "data mining" tab or another user-selectable control of the Web interface 66 to initiate data mining features.

4. The user selects a "success predictor" control of the Web interface 66 and runs it.

5. The analysis and modeling system 68 determines a probability of a contract being signed within two months based on rules in the system, preset parameters and a numerical thread composition value.

6. The Web interface 66 displays success predictor indicators for all threads in the "new products" folder. The user views the display and discovers that there are multiple threads with higher indicators of success.

7. The user decides to limit his/her involvement in the project represented by the particular thread but not abandon the project altogether.

Components of the system disclosed herein can have various security and privacy features. Components of a group of connected devices can be invisible to all but a pre-configured group of the devices based on identifiers. Some communications, annotations, links and supporting information can be password protected or encrypted. Log entries and output can by anonymized to protect the privacy of participants. Security can be set up for each communication thread to accommodate the requirements of all participants. Selected entries can be made invisible or expire and be deleted after a predefined time period. Some communications, based on user-defined or system-established exclusions, may be excluded from capturing by the capture module 36 for reasons such as privacy and confidentiality.

Each of the herein-disclosed components can include one or more computer processors that are directed by computer-readable program code stored by an associated computer-readable medium to perform the acts disclosed herein.

In conclusion, embodiments of the method and system disclosed herein allow users to capture relationships and interdependencies between communications in voice, text and other formats. This is beneficial for users who use multiple communication devices, multiple physical or virtual lines, and multiple communication modes (e.g. voice or data) of about equal importance. The system can handle communications from one or more wireless networks 80, the Internet 46, and a public switched telephone network (PSTN) 82. Via the Internet 46, the system can handle e-mail 84, Voice over IP (VoIP) 86, and instant messaging 88 communications.

Further, a knowledge management tool allows users to visualize, model, forecast and analyze these relationships for the communications. The system can be used as a value-added extension to current or future unified messaging (UM) paradigms, or can exist independently from them. The communication list application can be used in conjunction with ENUM, which is a standard to associate a telephone number with an IP address. Information about the device group can be stored in an ENUM database. A mapping of a communication address to an identifier of a device or access mode of communication can be stored in a public or private ENUM.

This architecture allows for communicating presence information to the appropriate network elements. In this case, the active device on which calls are received may indicate that the user is currently present and available on the active device or communication mode.

The method and system described herein can handle multiple users, each of whom defines his/her own device group. A group can be defined by one individual on behalf of another individual. For example, an assistant for a lawyer can define a device group for the lawyer. Further, the method and system supports sharing and transmitting the information concerning the device group to other users, e.g. those in address books have their communications directed, routed and forwarded accordingly to the active device or preferred device in the group.

It will be apparent to those skilled in the art that the disclosed embodiments may be modified in numerous ways and may assume many embodiments other than the particular forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    creating, by a user via a first user interface, a user-defined device group that identifies a plurality of different communication devices of the user, the communication devices having different communication addresses;
    designating at least one of the communication devices to receive an aggregated list of communications made with the communication devices in the user-defined device group;
    detecting a first communication made using a first communication device in the user-defined device group;
    generating a first entry for the aggregated list based on the first communication, the first entry including information identifying the first communication device;
    providing the first entry to the at least one communication device designated to receive the aggregated list;
    after providing the first entry, detecting a second communication made using a second communication device in the user-defined device group;
    generating a second entry for the aggregated list based on the second communication, the second entry including information identifying the second communication device;
    providing the second entry to the at least one communication device designated to receive the aggregated list; and
    editing the user-defined device group to add a communication device thereto or to remove a communication device therefrom.

2. The method of claim 1 wherein said editing comprises adding a third communication device to the user-defined device group the method further comprising:
    detecting a third communication made using the third communication device;
    generating a third entry for the aggregated list based on the third communication, the third entry including information identifying the third communication device; and
    providing the third entry to the at least one communication device designated to receive the aggregated list.

3. The method of claim 1 wherein said editing comprises removing a third communication device from the user-defined device group via the first user interface, the method further comprising after said editing:
    making a third communication using the third communication device; and
    keeping the aggregated list unchanged based on the third communication.

4. The method of claim 1 further comprising:
    disbanding, by the user via the first user interface, the user-defined device group.

5. The method of claim 1 wherein the communication devices comprise at least one landline or Internet telephone of the user, at least one wireless telephone of the user and at least one electronic mail device of the user, and wherein the different communication addresses comprise a plurality of telephone numbers and at least one electronic mail address.

6. The method of claim 5 wherein the plurality of telephone numbers comprise a work telephone number, a home telephone number and a wireless telephone number.

7. The method of claim 6 wherein at least one of the telephone numbers comprises a virtual telephone number.

8. The method of claim 5 wherein the communication devices further comprise a pager of the user.

9. The method of claim 1 wherein the at least one communication device designated to receive the aggregated list comprises the first communication device and the second communication device.

10. The method of claim 1 wherein the first communication comprises a first telephone call made to the first communication device, and wherein the second communication comprises a text message or a multimedia message sent to the second communication device.

11. The method of claim 1 further comprising:
    providing a second user interface to receive from the user a first annotation associated with the first entry and a second annotation associated with the second entry.

12. The method of claim 1 further comprising:
    providing a second user interface to receive from the user one or more commands to indicate how the user wants to organize the first entry and the second entry based on an ontology or user-defined categorization.

13. The method of claim 1 further comprising:
    providing a second user interface to receive from the user one or more commands to link the first entry and the second entry.

14. The method of claim 13 wherein the second user interface supports a private link that is visible only to one or more designated users.

15. The method of claim 1 further comprising:
    analyzing the first entry and the second entry to gain knowledge about a model of the user's communications within a certain context.

16. The method of claim 1 wherein the first communication device comprises a first mode of a converged communication device, the second communication device comprises a second mode of the converged communication device, wherein the first communication is made using the first mode of the converged communication device, and the second communication is made using the second mode of the converged communication device.

17. The method of claim 1 wherein the user-defined device group further identifies at least one communication line of the user.

18. The method of claim 17 wherein the at least one communication line comprises a Voice over Internet Protocol (VoIP) virtual line on demand.

19. The method of claim 1 wherein the first user interface comprises at least one of a Web interface and an Instant Messaging client.

20. The method of claim 1 further comprising:
automatically creating an ontology or hierarchy of communication threads.

21. The method of claim 1 further comprising:
communicating presence information to one or more network elements from an active device of the communication devices on which calls are received to indicate that the user is present and available on the active device.

22. The method of claim 21 wherein the presence information further indicates a communication mode of the active device.

23. The method of claim 1 wherein said detecting the first communication is performed by at least one of a signaling system 7 (SS7) trigger, an automatic forwarding of e-mail or metadata about e-mail in a mail transfer protocol, program code in a short messaging service center (SMSC) or an instant messaging (IM) server, and an SIP signaling mechanism.

24. The method of claim 1 further comprising processing the first entry and the second entry for retrieval and analysis using text and multimedia processing and statistical analysis.

25. The method of claim 1 wherein the communication addresses comprise at least one logical network address.

26. The method of claim 1 further comprising:
storing information about the device group in an ENUM database.

27. The method of claim 1 further comprising:
storing a mapping of a communication address to an identifier of a communication device or communication access mode in a public or private ENUM.

28. A system comprising:
a first user interface to create a user-defined device group that identifies a plurality of communication devices of a user, and to designate at least one of the communication devices to receive an aggregated list of communications made with the communication devices in the user-defined device group, wherein the communication devices have different communication addresses;
a capture module to detect a first communication made using a first communication device in the user-defined device group, to generate a first entry for the aggregated list based on the first communication, the first entry including information identifying the first communication device, and to provide the first entry to the at least one communication device designated to receive the aggregated list;
wherein after providing the first entry, the capture module is to detect a second communication made using a second communication device in the user-defined device group, generate a second entry for the aggregated list based on the second communication, the second entry including information identifying the second communication device, and to provide the second entry to the at least one communication device designated to receive the aggregated list; and
wherein after providing the second entry, the first user interface is to receive one or more commands to edit the user-defined device group to add a communication device thereto or to remove a communication device therefrom.

29. The system of claim 28 wherein the user-defined device group is edited to add a third communication device thereto, and thereafter the capture module is to detect a third communication made using the third communication device, generate a third entry for the aggregated list based on the third communication, the third entry including information identifying the third communication device, and to provide the third entry to the at least one communication device designated to receive the aggregated list.

30. The system of claim 29 wherein the user-defined device group is edited to remove a third communication device therefrom, and thereafter the capture module is to keep the aggregated list unchanged based on a third communication made using the third communication device.

31. The system of claim 28 wherein the first user interface is to provide a command for the user to disband the user-defined device group.

32. The system of claim 28 wherein the communication devices comprise at least one landline or Internet telephone of the user, at least one wireless telephone of the user and at least one electronic mail device of the user, and wherein the different communication addresses comprise a plurality of telephone numbers and at least one electronic mail address.

33. The system of claim 32 wherein the plurality of telephone numbers comprise a work telephone number, a home telephone number and a wireless telephone number.

34. The system of claim 33 wherein at least one of the telephone numbers comprises a virtual telephone number.

35. The system of claim 32 wherein the communication devices further comprise a pager of the user.

36. The system of claim 28 wherein the at least one communication device designated to receive the aggregated list comprises the first communication device and the second communication device.

37. The system of claim 28 wherein the first communication comprises a first telephone call made to the first communication device, and wherein the second communication comprises a text message sent to the second communication device.

38. The system of claim 28 further comprising:
a second user interface to receive a first annotation associated with the first entry and a second annotation associated with the second entry.

39. The system of claim 28 further comprising:
a second user interface to receive one or more commands to indicate how the user wants to organize the first entry and the second entry in an ontology or user-defined categorization.

40. The system of claim 28 further comprising:
a second user interface to receive one or more commands to link the first entry and the second entry.

41. The system of claim 40 wherein the second user interface supports a private link that is visible only to one or more designated users.

42. The system of claim 28 further comprising:
an analysis system to analyze the first entry and the second entry to gain knowledge about a model of the user's communications within a certain context.

43. The system of claim 28 wherein the first communication device comprises a first mode of a converged communication device, the second communication device comprises a second mode of the converged communication device, wherein the first communication is made using the first mode of the converged communication device, and the second communication is made using the second mode of the converged communication device.

44. The system of claim 28 wherein the capture module is to distinguish communications made with different modes of communication for the same device.

45. The system of claim 28 wherein the capture module is to distinguish communications for different logical communication addresses for the same device.

46. The system of claim 28 wherein the user-defined device group further identifies at least one communication line of the user.

47. The system of claim 46 wherein the at least one communication line comprises a Voice over Internet Procotol (VoIP) virtual line on demand.

48. The system of claim 28 wherein the first user interface comprises at least one of a Web interface and an Instant Messaging client.

49. The system of claim 28 wherein the capture module is to exclude one or more communications, based on user-defined or system-established exclusions, from being captured.

50. The system of claim 28 further comprising a knowledge management component to automatically create an ontology or hierarchy of communication threads.

51. The system of claim 28 wherein the capture module interfaces and interacts with a database that stores logical identifiers to the communication devices and their access modes.

52. The system of claim 51 wherein the database comprises an ENUM database.

* * * * *